United States Patent [19]

Okamoto et al.

[11] 4,073,726

[45] Feb. 14, 1978

[54] REMOVAL OF TRINITROTOLUENE FROM AQUEOUS MEDIA

[75] Inventors: Yoshiyuki Okamoto, Fort Lee, N.J.; Joseph Y. Wang, Alkhart, Ind.; Eng J. Chou, Sunnyside, N.Y.

[73] Assignee: Polytechnic Institute of New York, Brooklyn, N.Y.

[21] Appl. No.: 733,707

[22] Filed: Oct. 18, 1976

[51] Int. Cl.$^2$ .............................................. C02B 1/20
[52] U.S. Cl. ........................................ 210/45; 210/54; 260/290 R; 260/567.6 R; 260/570.5 R; 260/570.5 P; 260/645
[58] Field of Search ............... 210/45, 54; 260/290 R, 260/570.5 R, 570.5 P, 567.6 M, 645

[56] References Cited

U.S. PATENT DOCUMENTS 4,003,977  1/1977  Gilligan et al. .................. 260/645 X

OTHER PUBLICATIONS

Urbanski, Chemistry and Technology of Explosives, vol. I, The MacMillan Co., New York, 1964, pp. 161, 163, 164, 310, 311, 341, 343, 389, 390, and 391.

*Primary Examiner*—Leland A. Sebastian
*Attorney, Agent, or Firm*—Morgan, Finnegan, Pine, Foley & Lee

[57] ABSTRACT

There is provided a process for removing trinitrotoluene from waste water resulting from the manufacture of trinitrotoluene, the process comprising forming an admixture of the waste water and an amino group containing compound of the formula $(C_nH_{2n+1})_m(NH(CH_2)_x)_yNH_z$, wherein $n$ is 1 to 25, $m$ is 1 to 3, $x$ is 1 to 5, $y$ is 0 to 5, $z$ is 0 to 2 or the amine and a cationic compound of the formula $(C_nH_{2n+1})_4N^+X^-$, wherein $n$ is 1 to 25, and $X^-$ is $Cl^-$, $Br^-$, $SO_4H^-$; stirring the mixture to form a water insoluble reaction product of trinitrotoluene, and recovering the reaction product from the substantially trinitrotoluene free waste water.

12 Claims, No Drawings

REMOVAL OF TRINITROTOLUENE FROM AQUEOUS MEDIA

This invention relates to a method of removing pollutants comprising TNT from industrial waste water. More particularly, the method of the invention involves admixing such waste water with certain amino group containing compounds alone or together with a cationic compound, and stirring the mixture to cause the formation of a water insoluble reaction product of the trinitrotoluene which can be safely and readily removed.

BACKGROUND OF THE INVENTION

The manufacture of polynitrotoluene compounds for munitions and explosives is a major industry. Large production requirements and the broad variety of manufactured products lead to significant pollution problems, however. One of the most serious of these is waste waters which are generated during the manufacture of explosive polynitrotoluene compounds, such as trinitrotoluene (TNT), including 2,4,6-trinitrotoluene (α-TNT).

During manufacture, such compounds are subjected to a finishing process wherein the end product is dried, flaked and packaged. After manufacture, the production equipment and neighboring areas of the facilities housing such equipment are ordinarily rinsed thoroughly or washed down with water to clean away any residues of TNT which have been left behind. This cleaning procedure typically involves the use of considerable amounts of water, e.g., up to 500,000 gallons per day at a single site, and the resulting water wash is commonly discharged into nearby rivers or streams. The discharge of this water presents a major pollution problem. It has been found, for instance, that as little as 2.5 parts per million (ppm) of TNT is toxic to fish, while the concentration of TNT in industrial discharges is considerably higher, e.g., 50 ppm or more.

Extensive studies of the treatment of industrial waste waters from the manufacture of TNT have been conducted by various academic institutions, defense laboratories, private industries, and others. Methods investigated so far include bacterial degradation, carbon-adsorption techniques, irradiationdecomposition and adsorption on organic resins. These are described in the article, "Application of Liquid Chromatography to Pollution Abatement Studies of Munition Wastes", by Walsh et al, ANALYTICAL CHEMISTRY, Vol. 45, No. 7, June 1973, pages 1215–1220, and the references cited therein, incorporated herein by reference. At the present time, carbon adsorption enjoys the widest use in industrial waste treatment processes to remove TNT. In general, this technique involves contacting TNT-containing waste water with activated charcoal or an activated carbon meterial, e.g., Filtrasorb-400 (Calgon Corp., Pitts., Pa.), which results in the adsorption of TNT and its colored decomposition species on the activated adsorbent material. Carbon adsorption has several disadvantages which limit its use, however. For instance, even after the TNT has been adsorbed it remains explosive and highly dangerous, especially when dry. As a result, regeneration of the carbon material for further use, which is ordinarily carried out in the case of other pollutants by burning the activated carbon material to oxidize the adsorbed pollutants, can not be accomplished with reasonable safety when TNT is the adsorbed material. Moreover, as a result of the aforementioned carbon regeneration difficulties, the spent carbon adsorbent must usually be discarded and replaced with fresh amounts, which is a costly procedure.

Other methods involve extraction of the TNT from water by the use of water immiscible organic solvents, e.g., toluene. Significant amounts of TNT remain behind in the water layer even with extraction, however, and further waste treatment is required. Such further treatment often involves the use of the afore-mentioned carbon adsorption methods with their attendant disadvantages. Thus, there remains a widespread need for a method of removing TNT safely and efficiently from industrial discharges.

The present invention provides a simple, safe and low cost method of removing TNT from waste water. The method is based on the surprising discovery that certain amino group containing compounds alone or together with cationic compounds cause the formation of water-insoluble reaction products with TNT. The resulting precipitates can be readily and safely removed and the treated waste water can then be safely discharged or further treated to remove other pollutants, without hazard, by conventional methods.

DESCRIPTION OF THE INVENTION

According to the present invention there is provided a process for the treatment of waste water from the manufacture of trinitrotoluene, the process comprising:

a. forming an admixture of (i) waste water comprising an aqueous solution of trinitrotoluene and (ii) an amino group containing compound of the formula $$(C_nH_{2n+1})_m(NH(CH_2)_x)_yNH_z$$

wherein $n$ is 1 to 25, $m$ is 1 to 3, $x$ is 1 to 5, $y$ is 0 to 5, $z$ is 0 to 2, alone or with a cationic compound of the formula $$(C_nH_{2n+1})_4N^+X^-$$

wherein $n$ is 1 to 25, and $X^-$ is $Cl^-$, $Br^-$, $SO_4H^-$;

b. stirring the mixture to form a water insoluble reaction product of trinitrotoluene, and c. recovering the water insoluble reaction product from the waste water.

The method of the invention results in the formation of an insoluble, solid reaction product, which is characteristically comprised of dark colored, e.g., brownish, particles. By means of this invention, relatively high, toxic amounts of trinitrotoluene which are typically present in industrial waste waters from the manufacture of this compound, e.g., 50 to 150 ppm, can be reached in amount to harmless levels, e.g., 1 ppm or less. In addition, colored decomposition products of TNT, such as compounds which are formed when TNT containing waste water is exposed to ultraviolet light, are also removed by the present method. The water insoluble reaction product, after isolation and drying, can be burned without any hazard.

By way of illustration, waste water emanating from the manufacture of TNT is collected at ambient pressure and temperature in a pond, tank or some other suitable enclosure. The collection enclosure can be outfitted, if desired, with conventional equipment for adjusting the temperature. The amino group containing compound or a mixture of the amine and cationic compound is added slowly, with mixing, and the mixture is stirred until dark colored particles begin to form, usually in a couple of hours. The stirring is continued for a sufficient length of time, e.g., 24 to 48 hours, to cause substantially all of the TNT to react and to form its insoluble reaction products. The concentration of TNT remaining in the waste water can be monitored by withdrawing samples periodically and subjecting them to quantitative analysis, e.g., by spectrophotometry. When the TNT level has been reduced to 1 ppm or less, the stirring is stopped, and the dark colored precipitate is separated from the now substantially TNT-free waste water by filtering, e.g., through Diatomite or Celite filtering aids. Excess, unreacted amounts of the amino group containing compound or cationic compound can be recovered from the filtrate by a suitable technique, such as foam fractionation.

The temperatures and amounts of co-reactants for the TNT in the present invention can vary widely. In general, higher rates of solid formation occur with the use of relatively large amounts of the amine or the amine and cationic compound and elevated temperatures, e.g., 30° C. or above. Preferably, amounts of the amino group containing compound are used which provide an initial molar ratio of this compound to trinitrotoluene of from 1:1 to 5:1. Preferably, the cationic compound when used is present in amounts which provide an initial molar ratio of this compound to trinitrotoluene of from 0.5:1 to 2:1.

The amino group containing compounds of the method of this invention are commercially available or described in the literature. Within the above-mentioned general formula, this compound is preferably selected from among 1-dodecyldiethylenetriamine, 4-dodecyldiethylenetriamine, N-oleyl-1,3-diaminopropane, N-tall oil fatty-1,3-diaminopropane, N-Coco-1,3-diaminopropane and N-tallow-1,3-diaminopropane. In the case of using a cationic compound as co-reactant with the amine, the amine is preferably selected from among n-butylamine, n-propylamine, ethylene diamine, diethylamine, diethylenetriamine, alkylaminobispropylamine. The cationic compound is preferably selected from among dodecyltrimethyl ammonium salt, hexadecyltrimethyl ammonium salt and dodecylpyridinum salt.

Although the method of this invention has been described with particular reference to wash-down waste water, there are actually several kinds of waste waters generated during TNT manufacture, such as "red water" formed during sellite purification of TNT and "pink water" formed from the water washing of TNT following sellite purification. Although the so-called "red water" and "pink water" are normally disposed of by incineration, the present method is applicable for their waste treatment.

The method of the invention is further illustrated in the following examples, which are not intended to be limiting.

EXAMPLE 1

A one liter aqueous solution containing a 2:1 molar ratio of 4-dodecyldiethylenetriamine to TNT (in pink water, concentration 140 ppm) was prepared and stirred continuously at ambient temperature (about 23° C.), and solid products were formed. At the end of 24 hours, the mixture was filtered through Celite and Diatomite and the solid free filtrate was analyzed for TNT content by spectrophotometry. The concentration of TNT in the filtrate was 1.5 ppm.

Stirring was continued for an additional 24 hours, and the filtrate was again analyzed for TNT content as above. The concentration of TNT was about 0.5 ppm.

EXAMPLE 2

A one liter aqueous solution containing a molar ratio of 2:1 of N-tallow-1,3-diaminopropane to TNT (in pink water, concentration 140 ppm) was prepared and stirred continuously at 80° C. After 4 hours the mixture was cooled and the resulting solid products were filtered through Celite and Diatomite. The concentration of TNT in the filtrate was measured as in Example 1 and found to be 1.5 ppm.

Stirring of the mixture was continued for an additional 4 hours (8 hours total) at 80° C., and again filtered and tested for TNT concentration as above. Only about 0.5 ppm of TNT was left.

EXAMPLE 3

A one liter aqueous solution containing a molar ratio of 1:1:1 of diethylenetriamine, hexadecyltriammonium bromide to TNT (concentration 140 ppm, $5.5 \times 10^{-4}$ M) was prepared and stirred continuously at ambient temperature (about 25° C) and solid products were formed. At the end of 24 hours, the mixture was filtered through Celite and Diatomite and the solid free filtrate was analyzed for TNT content by spectrophotometry. The concentration of TNT in the filtrate was less than 1 ppm.

EXAMPLE 4

The removal of TNT from aqueous solutions was carried out by adding a mixture of an amine and a cationic compound to "pink" water at room temperature. Several 1-liter solutions were prepared containing $5.5 \times 10^{-4}$ M of TNT, $6.0 \times 10^{-4}$ M of N-methyl 1,3-diaminopropane and various concentrations of hexadecyltriammonium bromide, as shown in the table below. The TNT concentration was determined by spectrophotometric analysis, after 25 hours of stirring, and the results are summarized below.

| Sample No. | Conc. in the original solution | | | TNT % Removed after 25 hr |
| --- | --- | --- | --- | --- |
| | TNT | Amine | Surfactant | |
| 1 | $5.5 \times 10^{-4}$ M | $6.0 \times 10^{-4}$ M | $2.0 \times 10^{-4}$ M | 84% |
| 2 | $5.5 \times 10^{-4}$ M | $6.0 \times 10^{-4}$ M | $4.0 \times 10^{-4}$ M | 97% |
| 3 | $5.5 \times 10^{-4}$ M | $6.0 \times 10^{-4}$ M | $5.0 \times 10^{-4}$ M | 100% |
| 4 | $5.5 \times 10^{-4}$ M | $6.0 \times 10^{-4}$ M | $6.0 \times 10^{-4}$ M | 98% |
| 5 | $5.5 \times 10^{-4}$ M | $6.0 \times 10^{-4}$ M | $>1.0 \times 10^{-3}$ M (CMC) | ~ 0% |

It is known that the critical micelle concentration (CMC) for the bromide, which is a surfactant, is $9.2 \times 10^{-4}$ M. It was unexpected, therefore, that precipitation occurred immediately in the solutions of TNT and amine by adding the bromide in amounts below its CMC. When the bromide was added in amounts above its CMC, no precipitation occurred.

Although the above examples illustrated various modifications of the present invention, other variations and modifications will suggest themselves to those skilled in the art in the light of the above disclosure. It is to be understood, therefore, that changes may be made in the particular embodiments described herein which are within the spirit and full intended scope of the invention as defined in the appended claims.

We claim:

1. A process for the treatment of waste water from the manufacture of trinitrotoluene, said process comprising:
   a. forming an admixture of (i) waste water comprising an aqueous solution of trinitrotoluene and (ii) an amino group containing compound of the formula $(C_nH_{2n+1})_m(NH(CH_2)_x)_yNH_z$ wherein $n$ is 1 to 25, $m$ is 1 to 3, $x$ is 1 to 5, $y$ is 0 to 5, $z$ is 0 to 2, alone or with a cationic compound of the formula $(C_nH_{2n+1})_4N^+X^-$ wherein $n$ is 1 to 25, and $X^-$ is $Cl^-$, $Br^-$, $SO_4H^-$;
   b. stirring the mixture to form a water insoluble reaction product of trinitrotoluene, and
   c. recovering the water insoluble reaction product from the waste water.

2. A process as defined in claim 1 where said trinitrotoluene is 2,4,6-trinitrotoluene.

3. A process as defined in claim 1 wherein said waste water, before treatment, includes colored decomposition products of trinitrotoluene.

4. A process as defined in claim 1 wherein the amino group containing compound is selected from the group consisting of 1-dodecyldiethylenetriamine, 4-dodecyldiethylenetriamine, N-oleyl-1,3-diaminopropane, N-tall oil fatty-1,3-diaminopropane, N-Coco-1,3-diaminopropane and N-tallow-1,3-diaminopropane.

5. A process as defined in claim 1 wherein the amino group containing compound is selected from the group consisting of n-butylamine, n-propylamine, ethylene diamine, diethylamine, diethylenetriamine, alkylaminobispropylamine and the cationic compound is selected from the group consisting of dodecyltrimethyl ammonium salt and hexadecyltrimethyl ammonium salt.

6. A process as defined in claim 1 wherein in step (a), the molar ratio of said amino group containing compound of trinitrotoluene is in the range from 1:1 to 5:1.

7. A process as defined in claim 1 wherein the cationic compound is used in amounts which provide an initial molar ratio of this compound to trinitrotoluene of from 0.5:1 to 2:1.

8. A process as defined in claim 1 wherein the concentration of trinitrotoluene in said waste water after treatment, is 1 ppm or less.

9. A process as defined in claim 1 which is carried out at ambient temperature.

10. A process as defined in claim 1 which is carried out at an elevated temperature.

11. A process for the treatment of waste water from the manufacture of said compound, said process comprising:
    a. forming an admixture of 4-dodecyldiethylenetriamine and waste water comprising an aqueous solution of trinitrotoluene, said admixture having a molar ratio of 4-dodecyldiethylenediamine to trinitrotoluene of about 2:1;
    b. stirring the mixture at ambient temperature for a period of from 24 to 48 hours, to form a water insoluble reaction product of substantially all of said trinitrotoluene, and
    c. recovering the water insoluble reaction product from said waste water.

12. A process for the removal of trinitrotoluene from waste water from the manufacture of said compound, said process comprising:
    a. forming an admixture of N-tallow-1,3-diaminepropane and waste waters comprising an aqueous solution of trinitrotoluene, said admixture having a molar ratio of N-tallow-1,3-diaminepropane to trinitrotoluene of about 2:1;
    b. stirring the mixture at an elevated temperature of about 80° C. for a period of about 8 hours to form a water insoluble reaction product of substantially all of said trinitrotoluene, and
    c. recovering the water insoluble reaction product from said waste water.

* * * * *